(12) United States Patent
Cho et al.

(10) Patent No.: US 8,730,417 B2
(45) Date of Patent: May 20, 2014

(54) LIQUID CRYSTAL DISPLAY DEVICE AND METHOD OF FABRICATING THE SAME

(75) Inventors: Suk-Ho Cho, Gyeonggi-Do (KR);
Jae-Yi Chun, Gyeonggi-Do (KR);
Ji-Suk Min, Seoul (KR)

(73) Assignee: LG Display Co., Ltd., Seoul (KR)

( * ) Notice: Subject to any disclaimer, the term of this patent is extended or adjusted under 35 U.S.C. 154(b) by 919 days.

(21) Appl. No.: 12/880,559

(22) Filed: Sep. 13, 2010

(65) Prior Publication Data

US 2011/0063534 A1 Mar. 17, 2011

(30) Foreign Application Priority Data

Sep. 15, 2009 (KR) .................. 10-2009-0087224

(51) Int. Cl.
*G02F 1/13* (2006.01)
*G02F 1/1362* (2006.01)

(52) U.S. Cl.
USPC .......................................................... 349/33

(58) Field of Classification Search
None
See application file for complete search history.

(56) References Cited

U.S. PATENT DOCUMENTS

| 6,493,047 | B2 * | 12/2002 | Ha ................................... 349/40 |
| 6,760,092 | B2 * | 7/2004 | Yoo et al. ....................... 349/187 |
| 7,154,568 | B2 * | 12/2006 | Kim et al. ........................ 349/40 |
| 2002/0027621 | A1 | 3/2002 | Chae |
| 2003/0117536 | A1 | 6/2003 | Jeon |
| 2004/0124869 | A1 | 7/2004 | Lee et al. |
| 2007/0002204 | A1 | 1/2007 | Kim et al. |
| 2007/0085797 | A1 | 4/2007 | Kim |

FOREIGN PATENT DOCUMENTS

| CN | 1800917 A | 7/2006 |
| KR | 10-0831280 B1 | 5/2008 |
| TW | 200719066 A | 5/2007 |

OTHER PUBLICATIONS

European Search Report mailed on Nov. 18, 2011 by the European Patent Office in corresponding European Patent Application No. 10173207.1.
Korean Office Action for counterpart Korean Application No. 10-2009-0087224 dated Apr. 18, 2013.
Taiwanese Office Action (Tiawan Patent Application No. 099131078) dated Jul. 19, 2013.

* cited by examiner

*Primary Examiner* — Tina Wong
(74) *Attorney, Agent, or Firm* — Morgan, Lewis & Bockius LLP (57) ABSTRACT

The LCD device of this invention comprises an LC panel having a plurality of pixels defined by a plurality of gate lines and data lines, one or more gate shorting bars disposed outside the LC panel, for applying a test signal to the LC panel through gate lines, first and second data shorting bars disposed outside the LC panel, for applying test signals to odd and even numbered data lines, respectively, an odd numbered data link line connected to the odd numbered data line, and spacing from the first data shorting bar by a predetermined distance, an even numbered data link line connected to the even numbered data line, and spacing from the second data shorting bar by a predetermined distance, and a connection line for electrically connecting the odd numbered data link line and the first data shorting bar with each other, and connecting the even numbered data link line and the second data shorting bar with each other through contact holes, wherein the odd numbered data link line has a length equal to that of the even numbered data link line.

9 Claims, 5 Drawing Sheets

FIG. 5

LIQUID CRYSTAL DISPLAY DEVICE AND METHOD OF FABRICATING THE SAME

CROSS-REFERENCE TO A RELATED APPLICATION

Pursuant to 35 U.S.C. §119(a), this application claims the benefit of earlier filing date and right of priority to Korean Application No. 10-2009-0087224, filed on Sep. 15, 2009, the content of which is incorporated by reference herein in its entirety.

BACKGROUND OF THE INVENTION

1. Field of the Invention

The present invention relates to a liquid crystal display (LCD) device and a method of fabricating the same, and particularly, to an LCD device capable of preventing inferiority of a thin film transistor (TFT) due to a charging current difference by maintaining a charging current occurring from an odd numbered data line to be equal to a charging current occurring from an even numbered data line, and a method of fabricating the same.

2. Background of the Invention

A liquid crystal display (LCD) device is a transmissive flat panel display device, and is mainly applied to each kind of electronic devices such as a notebook computer, personal digital assistants (PDA), and a mobile phone. Recently, this LCD device is being actively practicalized much more than other flat display devices owing to its thin and light characteristic and high picture quality. As demands for high-definition televisions (HDTVs), digital televisions, and wall-mounted televisions are increased, research on an LCD device of a large area which can be applied to the TVs is actively ongoing.

Generally, LCD devices may be classified into several types according to a method of driving liquid crystal molecules. Nowadays, an active matrix TFT-LCD device is being mainly used owing to a fast response speed and less residual images.

Figure 1:
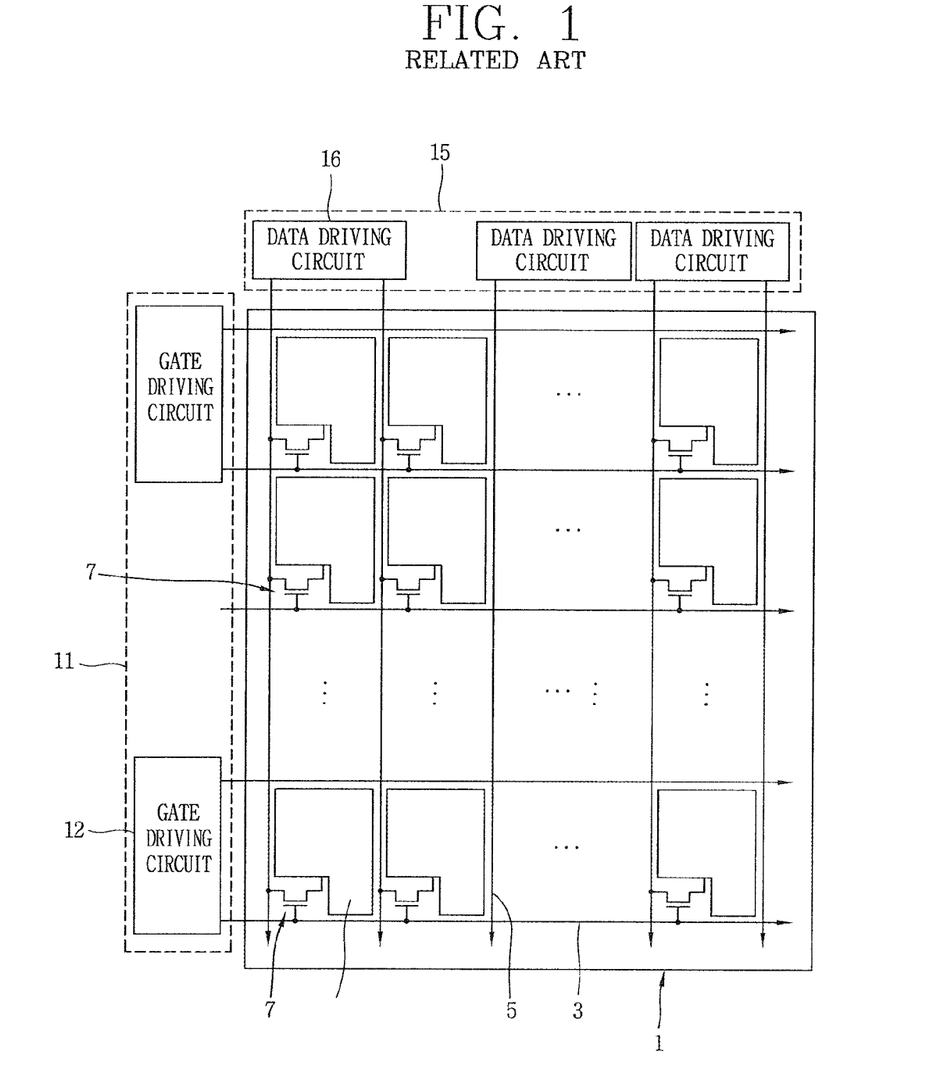
FIG. 1 is a view schematically showing a structure of a liquid crystal display (LCD) device in accordance with the conventional art.

FIG. 1 is a view schematically showing a structure of an LC panel 1 of a TFT-LCD device in accordance with the conventional art.

As shown in FIG. 1, a plurality of gate lines 3 and data lines 5 which define a plurality of pixels by being arranged in horizontal and vertical directions are formed on the LC panel 1. A thin film transistor (TFT) 7, a switching device is arranged in each pixel. When a scan signal is inputted to the TFT through the gate line 3, the TFT is switched to apply a signal inputted through the data line 5 to the pixel 9.

A gate driving portion 11 and a data driving portion 15 are arranged outside the LC panel 1. A plurality of gate driving circuits 12 are arranged at the gate driving potion 11, thereby inputting scan signals to the gate lines 3 through pads (not shown). This scan signal is applied to a gate electrode of the TFT 7 to activate a semiconductor layer of the TFT 7. A plurality of data driving circuits 16 are arranged at the data driving potion 15, thereby inputting image signals to the data lines 5 through pads (not shown). This image signal is applied to the pixel 9 through source and drain electrodes of the TFT 7 when the semiconductor layer has been activated (i.e., a channel has been formed at the semiconductor layer).

The pixel 9 is formed at an intersection between the gate line 3 and the data line 5, and is provided with one TFT 7. Accordingly, the pixels formed at each column is connected to one data line 5, and receive a signal applied through the corresponding data line 5.

In the conventional LCD device, one data line is connected to one pixel formed at each column. Accordingly, when 'N' data lines are arranged at the LC panel 1 and 'n' data lines are connected to the data driving circuits 16, 'N/n' data driving circuits 16 are totally required. Here, the data driving circuits 16 are expensive integrated circuits. Accordingly, when one data line is connected to one pixel formed at each column and a signal is applied to the data line, a large number of data driving circuits 16 are required. This may increase the fabrication costs of the LCD device.

Recently, as polycrystalline TFT techniques develop, there is implemented a structure of a system on panel (SOP) for integrating a data driving portion with pixels on an LC panel. In this structure, a large number of data driving circuits have to be formed in the LC panel. This may increase the fabrication costs, and increase an area of the LC panel.

In order to solve these problems, has been proposed an LCD device capable of sharing one data line by two pixels. In this LCD device, since two pixels are connected to one data line, two columns of pixels are connected to one data line.

However, this LCD device has the following problem.

When a threshold voltage difference occurs between a TFT of a pixel connected to an odd numbered data line and a TFT of a pixel connected to an even numbered data line at the time of fabricating the LCD device, a brightness of pixels connected to the odd numbered data line is different from a brightness of pixels connected to the even numbered data line. This may cause a picture quality to be deteriorated.

This problem may occur even when one data line is connected to one pixel. In this case, since one column of a pixel is connected to a corresponding data line, a brightness difference can not be easily recognized by a human's eyes. On the other hand, when one data line is shared by two pixels, a brightness difference occurs from two columns of pixels thus to be easily recognized by a human's eyes.

SUMMARY OF THE INVENTION

Therefore, an object of the present invention is to provide a liquid crystal display (LCD) device capable of preventing a threshold voltage difference between thin film transistors (TFTs) connected to data lines, by maintaining a charging current occurring from an odd numbered data line to be equal to a charging current occurring from an even numbered data line, by disconnecting a first data shorting bar and a second data shorting bar from an odd numbered data link line and an even numbered data link line, respectively, and a method of fabricating the same.

To achieve these and other advantages and in accordance with the purpose of the present invention, as embodied and broadly described herein, there is provided a liquid crystal display (LCD) device, comprising: an LC panel having a plurality of pixels defined by a plurality of gate lines and data lines; one or more gate shorting bars disposed outside the LC panel, for applying a test signal to the LC panel through gate lines; first and second data shorting bars disposed outside the LC panel, for applying test signals to odd and even numbered data lines, respectively; an odd numbered data link line connected to the odd numbered data line, and spacing from the first data shorting bar by a predetermined distance; an even numbered data link line connected to the even numbered data line, and spacing from the second data shorting bar by a predetermined distance; and a connection line for electrically connecting the odd numbered data link line and the first data shorting bar with each other, and connecting the even numbered data link line and the second data shorting bar with each other through contact holes, wherein the odd numbered data link line has a length equal to that of the even numbered data link line.

The LC panel may include a plurality of gate lines for applying scan signals to the pixels; a plurality of data lines crossing the gate lines, each data line shared by two adjacent pixels, for applying image signals to the corresponding pixels; a thin film transistor (TFT) formed at each of the pixels; a pixel electrode formed at each of the pixels; and a metallic layer formed at an interface between pixels which do not share the data line, wherein the TFT comprises a gate electrode formed on a first substrate, a gate insulating layer formed on the gate electrode, a semiconductor layer formed on the gate insulating layer, source and drain electrodes formed on the semiconductor layer, and a passivation layer formed over an entire region of the first substrate.

The first data shorting bar may be formed of the same material as the source electrode, the second data shorting bar may be formed of the same material as the gate electrode, and the connection line may be formed of Indium Tin Oxide (ITO) or Indium Zinc Oxide (IZO).

A second equi-potential circuit may be arranged between the odd numbered data link line and the even numbered data link line. And, a metallic line connected to the data line through the second equi-potential circuit may be arranged at an end of the data line.

To achieve these and other advantages and in accordance with the purpose of the present invention, as embodied and broadly described herein, there is also provided a method of fabricating a liquid crystal display (LCD) device, the method comprising: forming, on a substrate, an LC panel including gate lines and data lines which define a plurality of pixels, and TFTs, one or more gate shorting bars disposed outside the LC panel, for applying a test signal to the LC panel through gate lines, first and second data shorting bars disposed outside the LC panel, for applying test signals to an odd numbered data line and an even numbered data line, respectively, an odd numbered data link line connected to the odd numbered data line, and spacing from the first data shorting bar by a predetermined distance, an even numbered data link line connected to the even numbered data line, and spacing from the second data shorting bar by a predetermined distance, and a connection line for electrically connecting the odd numbered data link line and the first data shorting bar with each other, and connecting the even numbered data link line and the second data shorting bar with each other through contact holes; inputting test signals to the gate lines and the data lines through first and second gate shorting bars and the first and second data shorting bars, and performing a test for of the LC panel; cutting and removing the first and second gate shorting bars, the first and second data shorting bars, and the odd and even numbered data link lines by a cutting means.

The present invention may have the following advantages.

Firstly, a threshold voltage difference between the thin film transistors (TFTs) connected to the data lines may be prevented, by maintaining a charging current occurring from the odd numbered data line to be equal to a charging current occurring from the even numbered data line, by disconnecting the first data shorting bar and the second data shorting bar from the odd numbered data link line and the even numbered data link line, respectively, Secondly, the data lines may always have the same equi-potential by arranging first equi-potential circuits at the odd and even numbered data link lines, and by forming second equi-potential circuits and a metallic line at the end of the data lines.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

Hereinafter, the present invention will be explained in more detail with reference to the attached drawings.

The present invention is to provide a liquid crystal display (LCD) device having a structure that one data line is shared by two pixels, capable of preventing deterioration of a picture quality due to a threshold voltage difference between a TFT of a pixel connected to an odd numbered data line, and a TFT of a pixel connected to an even numbered data line.

The reason why a threshold voltage difference occurs between the TFT of the pixel connected to the odd numbered data line, and the TFT of the pixel connected to the even numbered data line is as follows.

In a fourth-mask process at the time of fabricating an LCD device, an active layer formed below source and drain electrodes is disposed below the source electrode, the drain electrode and the data line.

A shorting bar formed outside a display region is connected to the data line of the LCD device. This shorting bar serves to apply a test signal into a pixel through the data line, and is a part cut to be removed at the time of producing a final product of the LCD device. Generally, an odd numbered data line and an even numbered data line are connected to different data shorting bars. When the data shorting bars have areas different from each other, active layers disposed below the data shorting bars also have areas different from each other.

The active layer is dry-etched by a plasma with using a metallic layer thereabove as a blocking. Here, the active layer is not under-etched whereas an end portion of the metallic layer is under-etched by being wet-etched. This may cause the active layer to have a tail extending from the end of the metallic layer by a predetermined distance. Charges are accumulated on the tail of the active layer during processes, resulting in flowing a charging current. Since the data shorting bar connected to the odd numbered data line has an area different from that of the data shorting bar connected to the even numbered data line, an entire area and a tail area of the active layer connected to the odd numbered data line is different from those of the active layer connected to the even numbered data line. Accordingly, a charging current occurring from the odd numbered data line is different from a charging current occurring from the even numbered data line. This may cause a threshold voltage difference between the TFT connected to the odd numbered data line and the TFT connected to the even numbered data line.

Moreover, since the odd numbered data line and the even numbered data line are connected to different data shorting bars, the odd numbered data line has a length different from that of the even numbered data line. The length difference between the odd numbered data line and the even numbered data line causes a length difference of the active layers therebelow. Accordingly, a size of a charging current flowing along the odd numbered data line is different from that of a charging current flowing along the even numbered data line. This may cause a threshold voltage difference between the TFT connected to the odd numbered data line and the TFT connected to the even numbered data line.

To solve the above problems, the present invention is to provide an LCD device capable of preventing the occurrence of a threshold voltage difference between the TFT connected to the odd numbered data line and the TFT connected to the even numbered data line.

Figure 2:
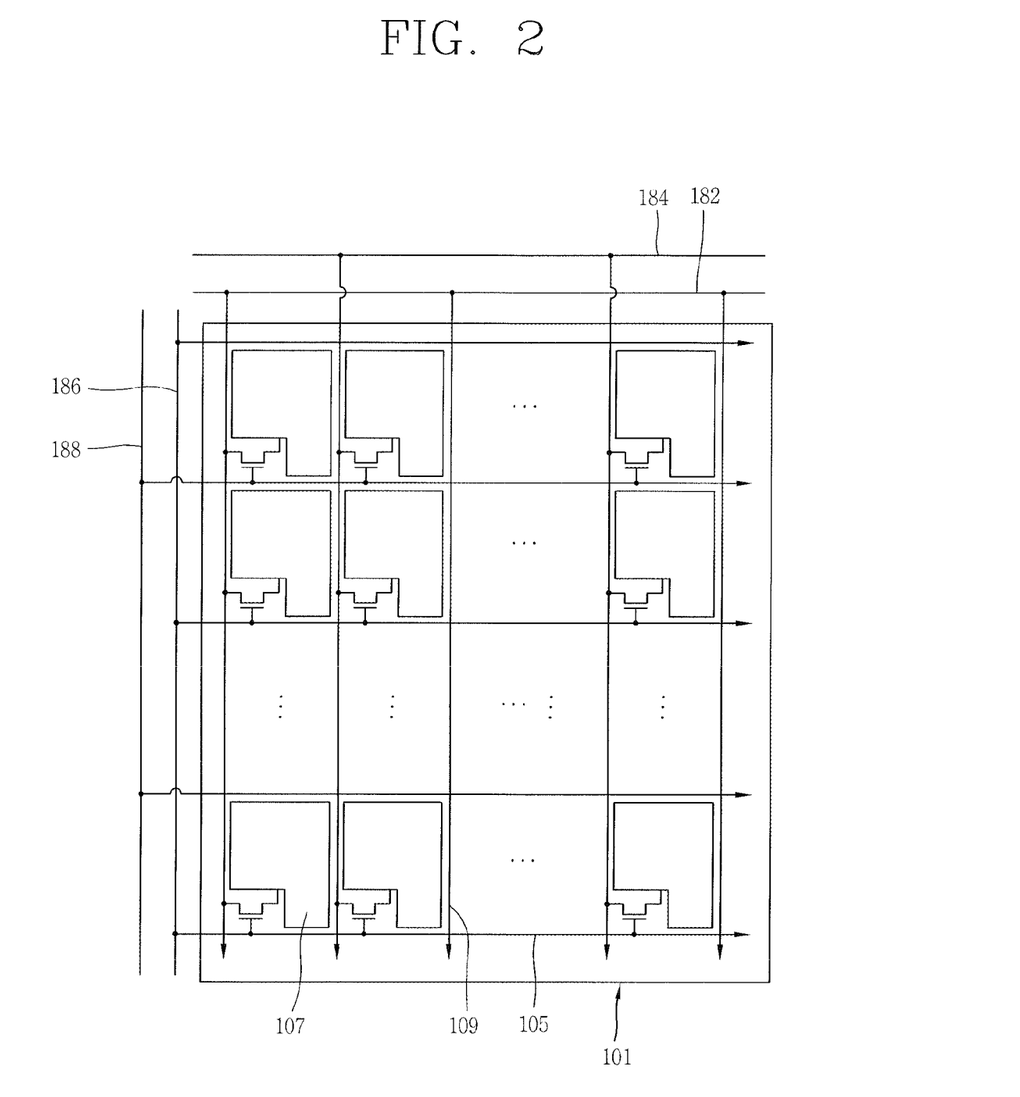
FIG. 2 is a view schematically showing a structure of a liquid crystal display (LCD) device according to the present invention.

FIG. 2 is a view schematically showing a structure of an LCD device according to the present invention.

As shown in FIG. 2, a plurality of gate lines 103 and data lines 105 which define a plurality of pixels by being arranged in horizontal and vertical directions are formed on an LC panel 101. A thin film transistor (TFT) 107, a switching device is arranged in each pixel. When a scan signal is inputted to the TFT through the gate line 103, the TFT is switched to apply a data signal inputted through the data line 105 to the pixel 109.

Data shorting bars 182 and 184, and gate shorting bars 186 and 188 are disposed at an outer periphery of the LC panel 101, and are connected to the data lines 105 and the gate lines 103, respectively. The data shorting bars 182 and 184, and the gate shorting bars 186 and 188 are additional lines for inputting test signals to the LC panel 101 through data pads and gate pads (not shown) formed at the ends of the data lines 105 and the gate lines 103. By the inputted test signals, the TFT 107 inside the pixel 109 can be inspected.

Although not shown, the gate shorting bars 186 and 188 are connected to a gate test signal generator, thereby supplying a gate test signal outputted from the gate test signal generator to the gate lines 103. And, the data shorting bars 182 and 184 are connected to a data test signal generator, thereby supplying a data test signal outputted from the data test signal generator to the data lines 105.

The data shorting bars 182 and 184, and the gate shorting bars 186 and 188 are formed in two in number, and are connected to the odd numbered line and the even numbered line, respectively. More concretely, the odd numbered data line is connected to the first data shorting bar 182, and the even numbered data line is connected to the second data shorting bar 184. And, the odd numbered gate line is connected to the first gate shorting bar 186, and the even numbered gate line is connected to the second gate shorting bar 188.

Although not shown, a gate driving portion and a data driving portion are disposed outside the LC panel 101. A scan signal is inputted to the TFT 107 through the gate line 103, and an image signal inputted to the data line 105 is applied to the pixel electrode via the TFT 107.

Figure 3A:
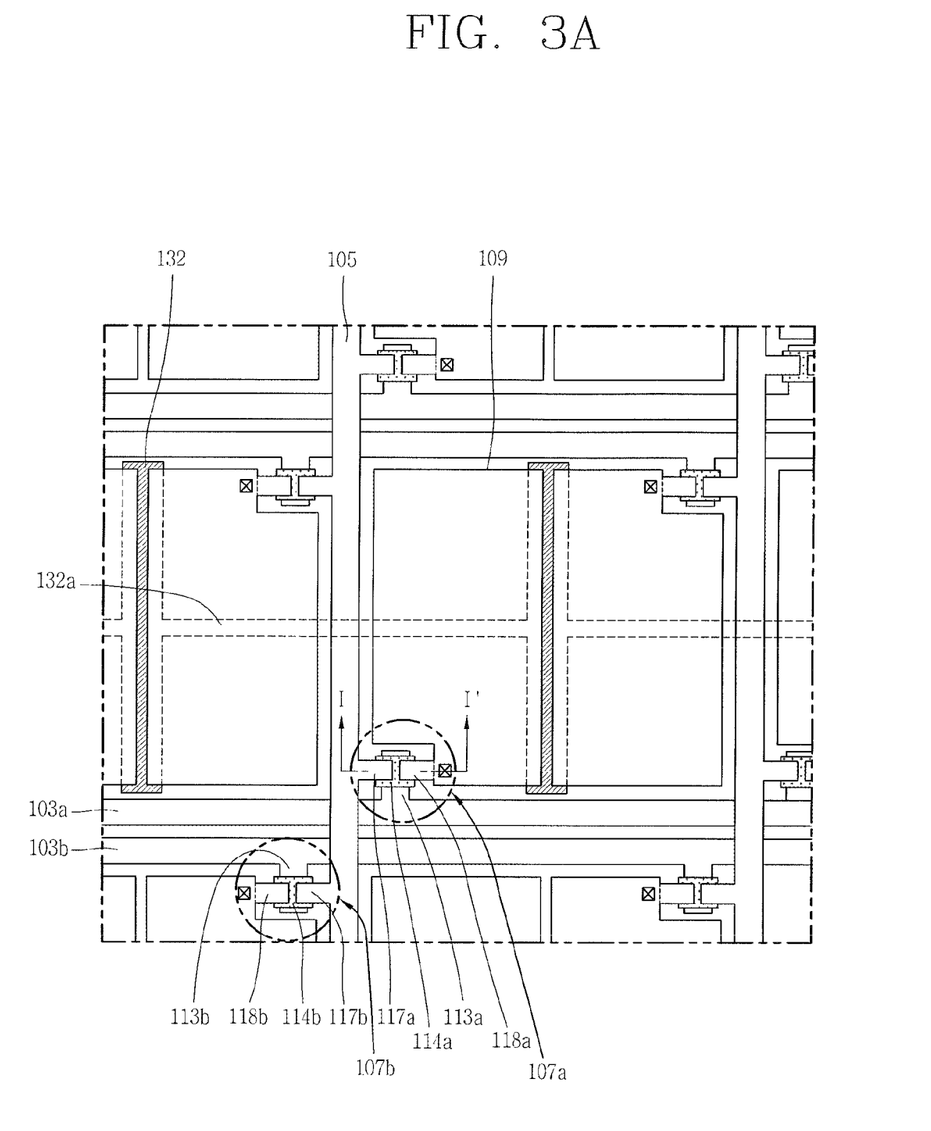
FIG. 3A is a planar view showing a structure of an LC panel of an LCD device according to the present invention.
Figure 3B:
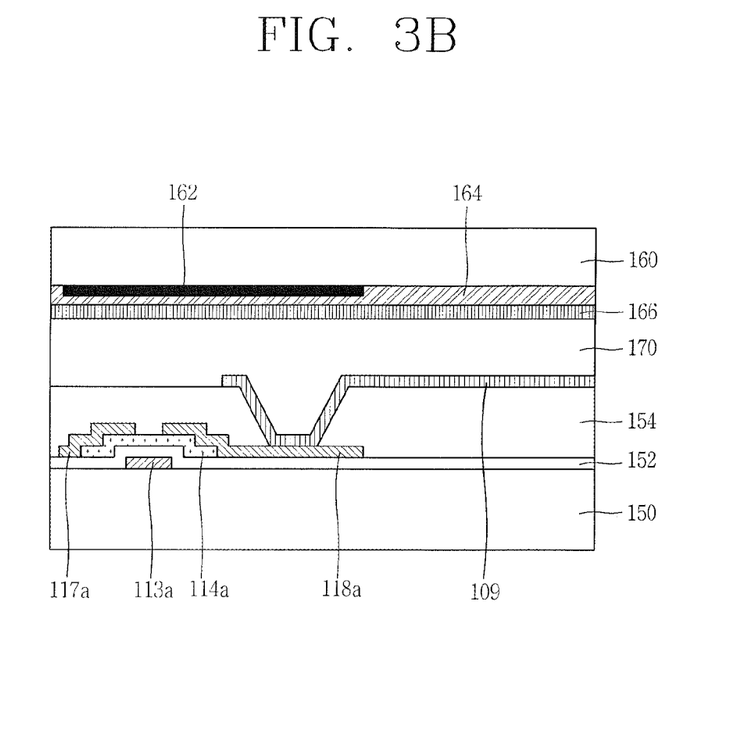
FIG. 3B is a sectional view taken along line 'I-I' in FIG. 3A.

FIG. 3A is a planar view showing a pixel structure of an LCD device according to the present invention, and FIG. 3B is a sectional view taken along line 'I-I' in FIG. 3A. Generally, a plurality of pixels are formed at an LCD device. However, the drawings illustrate only one pixel for convenience.

As shown in FIG. 3A, one pixel is defined on an LC panel by one gate line and one data line crossing each other. Two pixels are arranged between the gate lines 103a and 103b, and the data line 105. Each column of pixels are provided with the first gate line 103a and the second gate line 103b. A thin film transistor (TFT) 107a is formed at the pixel arranged between the gate line 103a and the data line 105, and a thin film transistor (TFT) 107b is formed at the pixel arranged between the gate line 103b and the data line 105. Here, the TFTs 107a and 107b formed at the pixels adjacent to each other in a state that the data line 105 is interposed therebetween share one data line 105, and apply different image signals to the pixels by being connected to the first gate line 103a and the second gate line 103b.

The TFTs 107a and 107b respectively include gate electrodes 113a and 113b connected to the gate lines 103a and 103b, semiconductor layers 114a and 114b formed on the gate electrodes 113a and 113b, and forming current channels when scan signals are applied to the gate electrodes 113a and 113b through the gate line lines 103a and 103b, source electrodes 117a and 117b formed on the semiconductor layers 114a and 114b, and applying signals inputted through the data line 105 to the pixels, and drain electrodes 118a and 118b.

Pixel electrodes 109 are formed in the pixels. The pixel electrodes 109 are arranged at the pixels adjacent to the data line 105 (i.e., pixels shared by one data line). However, when the pixels are adjacent to each other without the data line 105, the pixel electrodes 109 are arranged to face each other.

A metallic layer 132 is arranged between pixels not shared by the data line 109, i.e., pixels where the data line 105 has not been arranged. The metallic layer 132 is electrically connected to metallic layers 132 of the adjacent pixels by a metallic layer connection pattern 132a.

A structure of this LC panel will be explained in more detail with reference to FIG. 3B.

As shown in FIG. 3B, a gate electrode 113a is formed on a first substrate 150 formed of a transparent material such as glass, and a gate insulating layer 152 is formed on the first substrate 150 having the gate electrode 113a formed thereon. A semiconductor layer 114a is formed on the gate insulating layer 152, and a source electrode 117a and a drain electrode 118a are formed on the semiconductor layer 114a. A passivation layer 154 is formed on the first substrate 150 having the source electrode 117a and the drain electrode 118a formed thereon. A pixel electrode 109 formed of a transparent conductive material such as Indium Tin Oxide (ITO) or Indium Zinc Oxide (IZO) is formed on the passivation layer 154. A contact hole is formed at the passivation layer 154, through which the pixel electrode 109 is electrically connected to the drain electrode 118a. On a second substrate 160 formed of a transparent insulating material such as glass, formed are a black matrix 162 and a color filter layer 164. The black matrix 162 serves to prevent light leakage to an image non-display region, e.g., a TFT region, or a space between pixels, and the color filter layer 164 serves to substantially implement colors. A common electrode 166 which forms an electric field between itself and the pixel electrode 109 is formed on the color filter layer 164.

An LC layer 170 is formed between the first substrate 150 and the second substrate 160, thereby completing an LCD device. Alignment layers (not shown) for aligning LC molecules are formed on the first substrate 150 and the second substrate 160.

Figure 4:
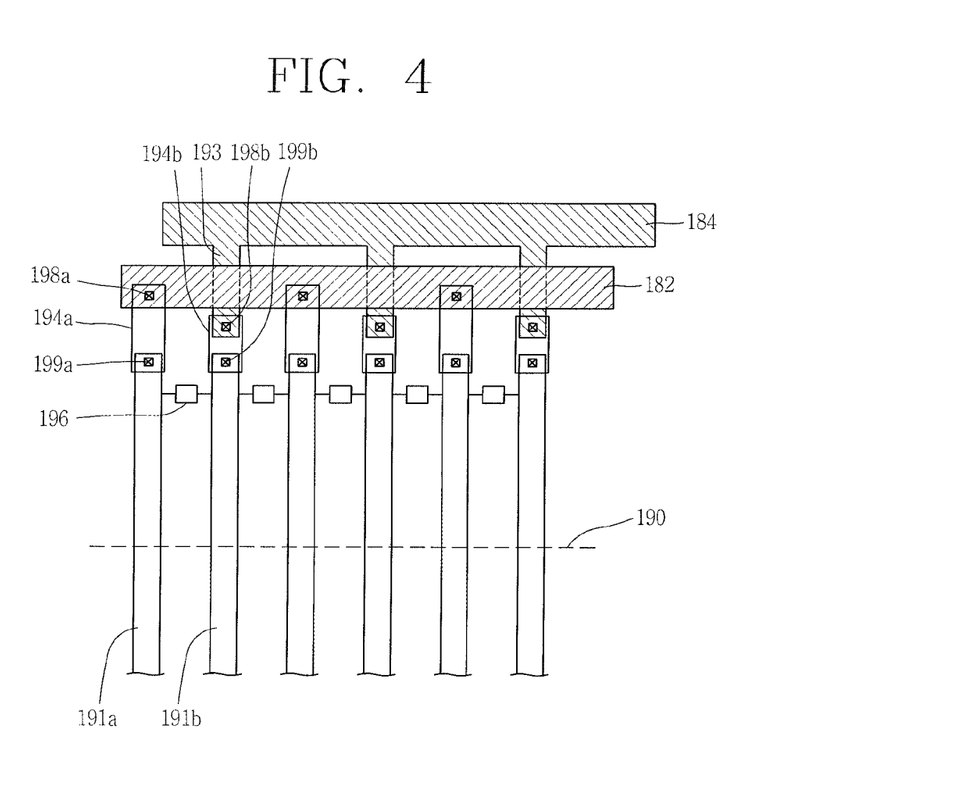
FIG. 4 is a view showing a connection structure of data shorting bars of an LCD device according to the present invention.

FIG. 4 is a view showing a connection structure of data shorting bars formed at an upper end of an outer periphery of an LCD device according to the present invention.

As shown in FIG. 4, an odd numbered data link line 191a is connected to a first data shorting bar 182, and an even numbered data link line 191b is connected to a second data shorting bar 182. Although not shown, an odd numbered data pad is connected to the odd numbered data link line 191a, and an odd numbered data line is connected to the odd numbered data pad. And, an even numbered data pad is connected to the even numbered data link line 191b, and an even numbered data line is connected to the even numbered data pad. As shown, a connection line 193 is formed at the second data shorting bar 184, through which the even numbered data link line 191b is connected to the second data shorting bar 184.

The first data shorting bar 182 is formed of the same metallic material as the source electrodes 117a and 117b of the TFTs, and the second data shorting bar 184 is formed of the same metallic material as the gate electrodes 113a and 113b of the TFTs.

As shown in FIG. 4, the odd numbered data link line 191a and the even numbered data link line 191b are disconnected from the first data shorting bar 182 and the second data shorting bar 184, respectively, and then are electrically connected to the first data shorting bar 182 and the second data shorting bar 184, respectively by first and second transparent electrodes 194a and 194b formed of ITO or IZO. The first and second transparent electrodes 194a and 194b are simultaneously formed when forming the pixel electrode 109 of the LC panel. The first transparent electrode 194a is electrically connected to the first data shorting bar 182 and the odd numbered data link line 191a, through a contact hole 198a of the first data shorting bar 182 and a contact hole 199a of the odd numbered data link line 191a, thereby electrically connecting the first data shorting bar 182 and the odd numbered data link line 191a with each other. The second transparent electrode 194b is electrically connected to the second data shorting bar 184 and the even numbered data link line 191b, through a contact hole 198b of the second data shorting bar 184 and a contact hole 199b of the even numbered data link line 191b, thereby electrically connecting the second data shorting bar 184 and the even numbered data link line 191b with each other.

The reason why the data link lines 191a and 191b are disconnected from the first and second data shorting bars 182 and 184, and then are indirectly connected to the first and second data shorting bars 182 and 184 by the transparent electrodes 194a and 194b is as follows.

If the data link lines 191a and 191b are not disconnected from the first and second data shorting bars 182 and 184 but are connected to each other, positions of the first and second data shorting bars 182 and 184 are different from each other. This may cause a length of the odd numbered data link line 191a connected to the first data shorting bar 182 to be different from a length of the even numbered data link line 191b connected to the second data shorting bar 184.

As aforementioned, a threshold voltage difference occurs between the TFT connected to the odd numbered data line and the TFT connected to the even numbered data line, because the active layers disposed below the data lines and the data link lines 191a and 191b, i.e., the semiconductor layers have sizes different from each other. If the data link lines 191a and 191b are not disconnected from the data shorting bars 182 and 184 but are directly connected to the data shorting bars 182 and 184, a length of the odd numbered data link line 191a becomes different from a length of the even numbered data link line 191b. As a result, the active layers have sizes different from each other, and charging amounts of the active layers become different from each other. This may cause a threshold voltage difference between the TFT connected to the odd numbered data line and the TFT connected to the even numbered data line.

In the present invention, the data link lines 191a and 191b are disconnected from the first and second data shorting bars 182 and 184, thereby making the length of the odd numbered data link line 191a equal to the length of the even numbered data link line 191b. This makes charging amounts of the active layers equal to each other. Accordingly, a threshold voltage difference does not occur between the TFT connected to the odd numbered data line 191a and the TFT connected to the even numbered data line 191b.

Furthermore, the data link lines 191a and 191b are disconnected from the first and second data shorting bars 182 and 184, thereby preventing charges of the first and second data shorting bars 182 and 184 from being introduced into the odd numbered data link line 191a and the even numbered data line 191b. This may prevent flowing of different amounts of charges into the data lines due to an area difference between the first and second data shorting bars 182 and 184.

Generally, charges are generated from the active layers when the active layers are etched by plasma. Accordingly, even if the data link lines 191a and 191b are connected to the first and second data shorting bars 182 and 182 by the transparent electrodes 194a and 194b formed in a later process, charging currents do not flow to the data lines by the transparent electrodes 194a and 194b. After completing the LC panel by the transparent electrodes 194a and 194b, test signals are inputted to the data lines to perform a test.

First equi-potential circuits 196 are arranged between the data link lines 191a and 191b adjacent to each other. The first equi-potential circuits 196 serve to constantly maintain potentials of the data lines adjacent to each other during processes, and are formed of TFTs, etc.

Once a test has been performed after completing the LC panel, the data shorting bar and the connection structure are removed by laser or a cutting wheel.

Figure 5:
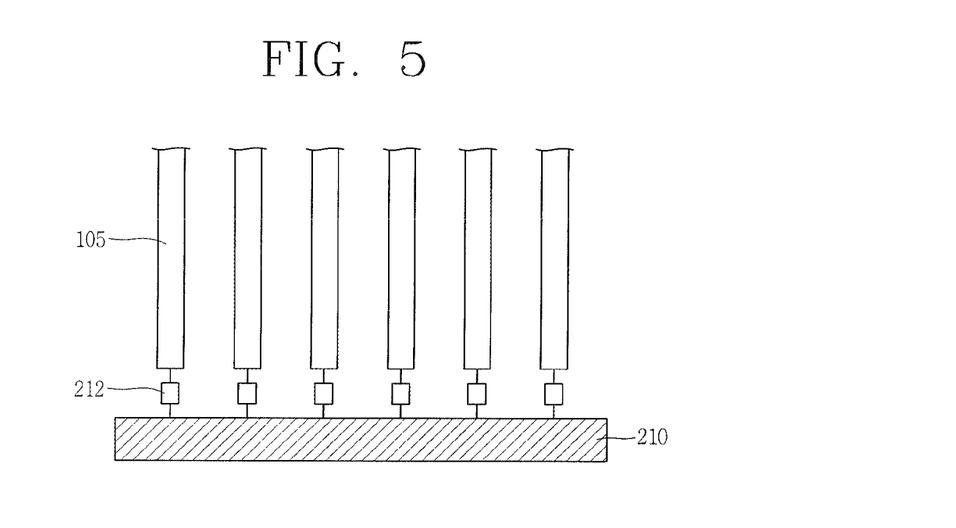
FIG. 5 is a view showing a structure of lower end portions of data lines of an LCD device according to the present invention.

FIG. 5 is a view showing a structure of a lower end portion of an outer periphery of an LCD device according to the present invention.

As shown in FIG. 5, end portions of the data lines 105 are connected to a metallic line 210 through second equi-potential circuits 212. The second equi-potential circuits 212 are formed of TFTs, and serve to form the data lines 105 with the same potential. The second equi-potential circuits 212 connected to the data lines 105 are connected to the metallic line 210. Since the metallic line 210 consists of the source electrodes 117a and 117b of the TFTs, all of the data lines 105 can maintain the same potential. Here, the metallic line 210 may be grounded.

The second equi-potential circuits 212 and the metallic line 210 perform the same function as the first equi-potential circuits 196 formed at upper ends of an outer periphery of the LCD device. In the present invention, the first and second equi-potential circuits 196 and 197 are dually arranged. This may allow the data lines to always maintain a constant potential even if one of the two equi-potential circuits is mal-operated.

As aforementioned, the odd numbered data link lines 191a and the even numbered data link line 191b are disconnected from the first and second data shorting bars 182 and 184, thereby preventing charging currents resulting from the first and second data shorting bars 182 and 184 from being introduced into the data lines. Furthermore, the odd numbered data link line 191a and the even numbered data link line 191b are disconnected from the first and second data shorting bars 182 and 184, thereby making the length of the odd numbered data link line 191a equal to the length of the even numbered data link line 191b. This makes the amount of a charging current resulting from the odd numbered data link line 191a equal to the amount of a charging current resulting from the even numbered data link line 191b. Accordingly, a threshold voltage difference between the TFT connected to the odd numbered data line and the TFT connected to the even numbered data line.

In the LCD device, the pixel of the LC panel shown in FIG. 3, the gate shorting bars 186 and 188 and the data shorting bars 182 and 182 disposed on an outer periphery of the LC panel shown in FIGS. 4 and 5 are formed on a mother glass substrate by a TFT fabrication process. Then, the data link lines 191a and 191b are connected to the data shorting bars 182 and 184 by the transparent electrodes, and test signals are applied to the LC panel through the data shorting bars 182 and 184 and the gate shorting bars 186 and 188. After testing the LC panel, the mother glass substrate is cut into unit LC panels by using laser or a cutting device such as a cutting wheel. Then, the unit LC panels are separated from each other along cutting lines, and the shorting bar connection structure is removed from each of the unit LC panels. Accordingly, an LCD device is completed.

The present invention may be applied not only to the specific structure disclosed in the detailed description, but also to various structures.

For instance, the LC panel has a structure that two pixels share one data line. However, the LC panel may have a structure that one pixel is connected to one data line. The reason why the LC panel of the present invention has a structure that two pixels share one data line is because the present invention can have a maximized effect from the structure. It is obvious that the present invention can have an effect from an LCD device having a structure that one pixel is connected to one data line.

Furthermore, the first equi-potential circuits or the second equi-potential circuits may be applied not only to circuits having a specific structure, but also to any types of equi-potential circuits.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
   an liquid crystal (LC) panel comprising a plurality of pixels defined by a plurality of gate lines and data lines;
   at least one gate shorting bar disposed at the outside of the LC panel, and configured to apply a test signal to the LC panel through gate lines;
   first and second data shorting bars disposed at the outside of the LC panel, and configured to apply test signals to odd and even numbered data lines, respectively;
   odd numbered data link lines connected to the odd numbered data lines, the odd numbered data link lines being apart from the first data shorting bar in a predetermined distance;
   even numbered data link lines connected to the even numbered data lines, the even numbered data link lines being apart from the second data shorting bar in a predetermined distance;
   a transparent electrode for electrically connecting the odd numbered data link lines and the first data shorting bar with each other, and connecting the even numbered data link lines and the second data shorting bar with each other through contact holes; and
   a first equi-potential circuit disposed between the odd numbered data link line and the even numbered data link line, and configured to maintain potentials of the odd and even numbered data link lines to be equal to each other,
   wherein the odd numbered data link lines have a length equal to that of the even numbered data link lines.

2. The LCD device of claim 1, wherein the LC panel comprises:
   a plurality of gate lines for applying scan signals to the pixels;
   a plurality of data lines crossing the gate lines, each data line being shared by two adjacent pixels to apply an image signal to the corresponding pixel;
   a thin film transistor (TFT) at each of the pixels;
   a pixel electrode at each of the pixels; and
   a metallic layer at a boundary region between pixels which do not share by the data line.

3. The LCD device of claim 2, wherein the TFT comprises:
   a gate electrode on a first substrate;
   a gate insulating layer on the gate electrode;
   a semiconductor layer on the gate insulating layer;
   source and drain electrodes on the semiconductor layer; and
   a passivation layer over an entire region of the first substrate.

4. The LCD device of claim 3, wherein the first data shorting bar is formed of the same material as the source electrode, the second data shorting bar is formed of the same material as the gate electrode.

5. The LCD device of claim 1, wherein the transparent electrode is formed of Indium Tin Oxide (ITO) or Indium Zinc Oxide (IZO).

6. The LCD device of claim 1, further comprising:
   a second equi-potential circuit connected to an end of the data line; and
   a metallic line disposed below the data line, and the metallic line being connected to the data line through the second equi-potential circuit.

7. The LCD device of claim 6, wherein the metallic line is formed of the same material as the source electrode of the TFT.

8. A method of fabricating a liquid crystal display (LCD) device, the method comprising:

forming, on a substrate, an LC panel including gate lines and data lines for defining a plurality of pixels and TFTs, at least one gate shorting bar at the outside of the LC panel to apply a test signal to the LC panel through gate lines, first and second data shorting bars at the outside of the LC panel to apply test signals to odd numbered data lines and even numbered data lines, respectively, odd numbered data link lines connected to the odd numbered data lines and apart from the first data shorting bar in a predetermined distance, even numbered data link lines connected to the even numbered data lines and apart from the second data shorting bar in a predetermined distance, and a first equi-potential circuit disposed between the odd numbered data link line and the even numbered data link line to maintain potentials of the odd and even numbered data link lines to be equal to each other;

forming a transparent electrode for electrically connecting the odd numbered data link line and the first data shorting bar with each other, and connecting the even numbered data link line and the second data shorting bar with each other through contact holes;

inputting test signals to the gate lines and the data lines through first and second gate shorting bars and the first and second data shorting bars, and performing a test for the LC panel;

cutting and removing the first and second gate shorting bars, the first and second data shorting bars, and the odd and even numbered data link lines by a cutting means.

9. The method of claim 8, further comprising:

forming a second equi-potential circuit connected to an end of the data line and a metallic line connected to the data line through the second equi-potential circuit, the metallic line being disposed below the data line.

* * * * *